United States Patent
Syvakari

[11] 3,877,707
[45] Apr. 15, 1975

[54] HIGH PRESSURE SEAL

[76] Inventor: Pertti Syvakari, Barongatan 7, 5-252 60 Helsingborg, Sweden

[22] Filed: Apr. 26, 1974

[21] Appl. No.: 464,461

[30] Foreign Application Priority Data
June 6, 1973 Sweden.............................. 7379360

[52] U.S. Cl. .................. 277/190; 277/195; 277/198
[51] Int. Cl............................................... F16j 15/56
[58] Field of Search ........ 277/116.2, 117, 118, 119, 277/122, 187, 188, 190, 191, 192, 195, 198

[56] References Cited
UNITED STATES PATENTS

| | | | |
|---|---|---|---|
| 2,080,271 | 5/1937 | Hirst | 277/195 |
| 2,625,413 | 1/1953 | Christensen | 277/195 |
| 2,670,259 | 2/1954 | Bergeron | 277/198 |
| 2,931,671 | 4/1960 | Beeley | 277/190 |
| 2,962,332 | 11/1960 | Hale | 277/198 |
| 3,144,162 | 8/1964 | Morris | 277/195 |
| 3,606,356 | 9/1971 | Beroset | 277/190 |
| 3,817,517 | 6/1974 | Lundquist | 277/176 |

*Primary Examiner*—Robert I. Smith

[57] ABSTRACT

In a press for high pressure in which a cylinder is provided with a seal holder, a seal arrangement is provided for sealing between the wall of the high pressure cylinder and a die or an axially movable plunger projecting into the high pressure cylinder. The seal is composed of inner and outer metal sealing rings which rest against the seal holder and which, in combination with the seal holder, form an annular groove in which is arranged an elastic sealing ring which seals between the metal sealing rings and the seal holder. The inner sealing ring and the outer sealing ring have surfaces facing each other and intended to fix the inner ring axially in the cylinder.

4 Claims, 5 Drawing Figures

HIGH PRESSURE SEAL

BACKGROUND OF THE INVENTION

1. Field of the Invention

The invention relates to a press for a very high pressure having a spherical high pressure seal for sealing between the wall of a high pressure cylinder and a die or axially movable plunger projecting into the high pressure cylinder.

2. The Prior Art

During hydrostatic extrusion the work is carried out at very high pressure levels: usually the working pressure is between 10 and 20 kbar. In extrusion presses reliable seals are required at this very high pressure for sealing between the inner wall of a high pressure cylinder and a movable pressure-generating piston and also an easily removable and insertable die. The inner diameter of the cylinder at the highest working pressure is from 0.5 to 1 per cent greater than at atmospheric pressure, which means that the width of the gap between the cylindrical wall and the plunger and the die, respectively, varies, which makes the sealing problems extremely difficult and necessitates new seals. Seals for this purpose comprise an outer first sealing ring of metal having an outer surface abutting the cylindrical wall and an end surface abutting a seal holder, and an inner, second sealing ring of metal having an inner cylindrical surface abutting the plunger or the die and an end surface abutting said seal holder. Seals of this kind have been described previously in the U.S. Pat. No. 3,833,227 and in the Swedish Pat. application Nos. 73063497 and 73063505. The present invention is a further development of the known seals.

SUMMARY OF THE INVENTION

According to the invention, the outer and inner sealing rings and the seal holder form an annular slot, and a seal is applied in this slot sealing between the sealing rings and the seal holder. In this way, pressure medium in the gap between the walls is prevented from penetrating out between the end surfaces of the sealing rings and the surface of the seal holder abutting the rings. In the embodiment according to the invention all gaps are eliminated through which the seal can be pressed out and be destroyed.

In previous constructions there has been, or has been formed, a gap on the side of the sealing ring facing away from the pressure chamber compartment between the said metallic rings when the high pressure cylinder has expanded because of the pressure, and the elastomeric sealing ring has been pressed into this gap and gradually been destroyed. The invention therefore results in reduced stresses on the elastomeric sealing ring and, thus, an increased life of this ring as well as of the whole seal.

According to the invention, there is provided, in a high pressure cylinder which has a seal holder at the end, a sealing arrangement for sealing between the wall of the cylinder and a die or axially movable plunger which projects into the cylinder. The seal is composed of inner and outer sealing rings of metal, the outer sealing ring having an outer cylindrical surface abutting the cylindrical wall and an end surface abutting the seal holder, and the inner ring having an inwardly directed cylindrical surface abutting the die or the plunger and an end surface abutting the seal holder. The rings together with the seal holder form an annular groove in which is arranged an elastic sealing ring which seals between the inner and outer rings and the seal holder.

The inner ring may have an outwardly facing conical surface, the generatrices of which coincide with the center line of the ring inside the high pressure cylinder, while the outer ring has an inwardly facing conical surface facing the conical surface of the inner ring. The outer ring may also have a second conical surface spaced from and facing the conical surface of the inner ring, forming between them an annular groove in which an elastomeric sealing ring is arranged.

BRIEF DESCRIPTION OF THE DRAWINGS

The invention will be described more fully with reference to the accompanying drawings, in which it is applied for sealing between a high pressure cylinder and a pressure-generating piston projectable into said cylinder.

FIGS. 2 to 5 disclose the part of the pressure chamber and the piston indicated by A — A in FIG. 1.

DESCRIPTION OF THE PREFERRED EMBODIMENTS

Figure 1:
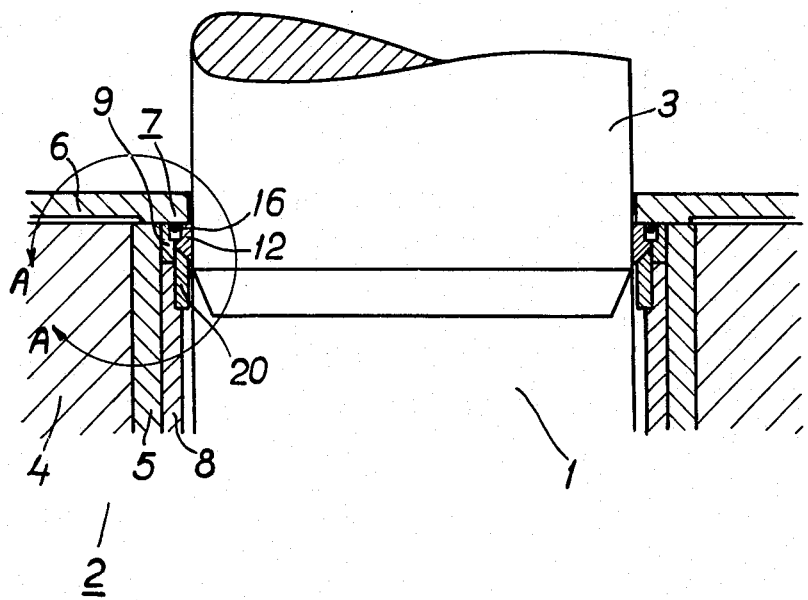
FIG. 1 shows a section through one end of a high pressure chamber.

In the drawings 1 designates a pressure chamber. Around the pressure chamber there is a high pressure cylinder 2 in which a plunger 3 may be inserted in order to generate a pressure in a pressure medium enclosed in the pressure chamber. Said high pressure cylinder 2 comprises a cylinder 4 which may be built up in conventional manner of a tube and prestressed strips wound around this tube and one or more exchangeable liners. The cylinder is provided with end pieces 6 forming a seal holder which takes up axial forces acting on the seal. Between the liner 5 and the plunger 3 is a seal 7. Inside the liner 5 is a spacing sleeve 8 which, on the one hand, forms a protection for the liner 5 and, on the other hand, forms a spacer which axially fixes the seal 7 and a corresponding seal (not shown) at the other end of the cylinder.

Figure 2:
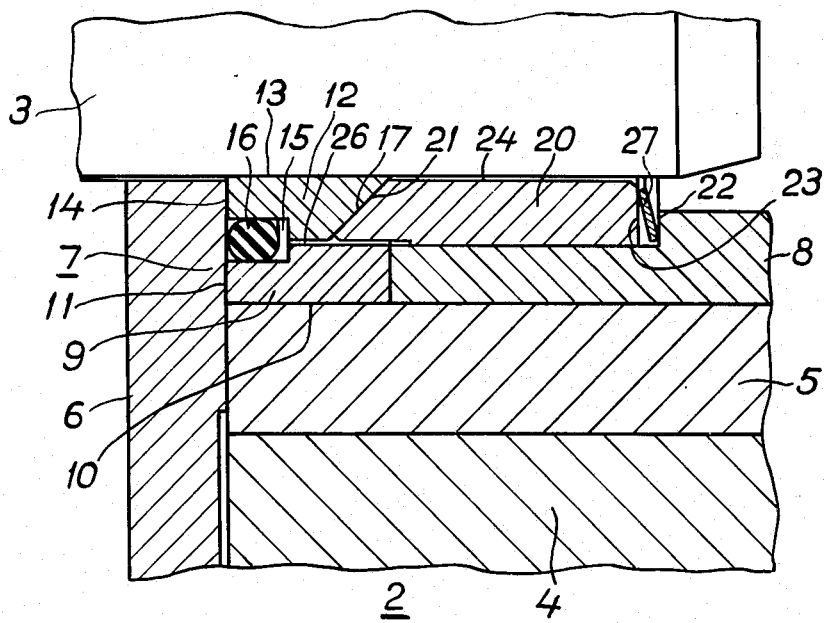
FIG. 2 is an enlarged view of the seal of FIG. 1.

In the embodiment of the seal 7 shown in FIGS. 1 and 2, the seal comprises an outer first sealing tube 9 of metal with an outer cylindrical sealing surface 10 abutting the cylindrical wall and an end surface 11 abutting the seal holder 6, and an inner second sealing ring 12 of metal with an inner cylindrical sealing surface 13 abutting the plunger 3 and an end surface 14 abutting the seal holder 6. The sealing ring 9 is inserted into the liner 5 in a prestressed manner. The prestressing should be as high as possible, and preferably so high that the ring constantly bears against the liner with a force dependent on the prestressing. Suitably, the ring 9 is also clamped between the holder 6 and the spacing sleeve 8. Between the ring 12 and the plunger 3 the clearance should be very small, preferably there should be no clearance at all there. The rings 9 and 12 are shaped so that an annular gap 15 is formed between them and the seal holder 6, adapted for a sealing ring 16 of elastomeric material. Axially inward from the gap 15 is a think gap 26 between the rings 9 and 12. The inner part of the ring 12 is formed with a radially outwardly directed conical end surface 17, the generatrices of which coincide with the mutual center line of the ring and the cylinder inside the pressure chamber. The seal also includes a third sealing ring 20 arranged between the plunger 3 and the spacing sleeve 8, said sealing ring having a limited axial displacement. Said sealing ring is formed with an inwardly directed conical surface 21 abutting the conical surface 17 of the ring 12. Its axial position is also determined by the shoulder 22 in the spacing sleeve 8. In order to effect a permanent contact between the surfaces 17 and 21, a circlip 27 is inserted between the shoulder 22 and the end surface 23. Between the plunger 3 and the ring 20 there is a clearance fit so that an annular gap 24 is formed between the ring and the plunger. The object of the ring 20 is to achieve a pressure against the conical surface 17 of the ring 12, which pressure, when the pressure grows up in the pressure chamber 2, achieves a decrease in the diameter of the innermost part of the ring 12, which guarantees a sealing contact between the ring 12 and the plunger 3. The required pressure arises from the fact that a flow of pressure medium from the chamber 2 through the gaps 24 and 26 to the gap 15 leads to a considerable pressure drop if the clearance between the ring 20 and the plunger 3 is small, that is, if the gap 24 has a small thickness. The clearance should be below 0.5 mm, normally below 0.1 mm. A good effect has been obtained with a clearance of about 0.03 mm and a piston diameter of 180 mm.

Figure 3:
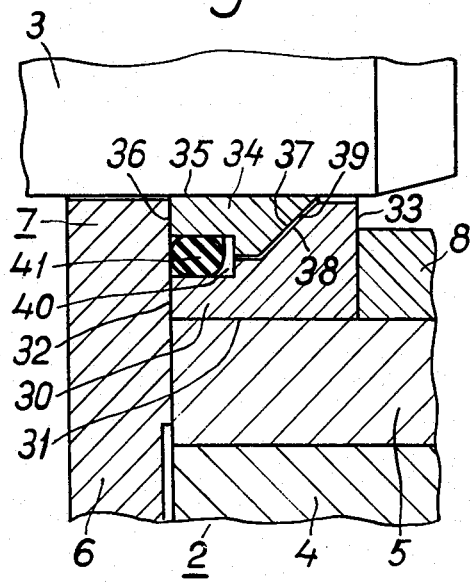
FIGS. 3, 4, and 5 show on a larger scale three variants of the seal.
Figure 4:
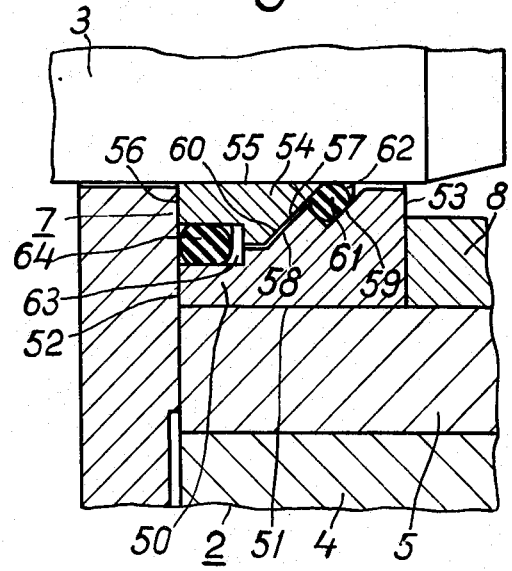

FIGS. 3 and 4 show simpler embodiments of the seal 7, comprising only two metal rings. In the embodiment according to FIG. 3 there is an outer first sealing ring 30, inserted into the liner 5 in a prestressed manner, so that its outer surface 31 bears against the liner with a force dependent on the prestressing. As a rule, the ring is clamped between the seal holder 6 and the spacing sleeve 8, so that its end surfaces 32 and 33 are in permanent contact with the holder and the spacing sleeve, respectively. The seal includes a second, inner sealing ring 34 with an inner sealing surface 35 abutting the plunger 3 and an end surface 36 abutting the seal holder.

The inner end of the ring is formed with a radially outwardly direct conical surface 37. The ring 30 is formed with a radially inwardly directed conical surface 38 facing the surface 37. There is a small gap 39 between the said conical surfaces. The rings 30 and 34 are formed so that an annular gap 40 is formed between them and the seal holder 6. In said gap there is an elastomeric sealing ring 41.

In the embodiment according to FIG. 4, there is also a first sealing ring 50 which is inserted into the liner 5 in a prestressed manner so that its outer surface 51 abuts the liner. As a rule, the ring is also clamped between the seal holder 6 and the spacing sleeve 8 so that its end surfaces 52 and 53 are in permanent contact with the holder and the spacing sleeve, respectively.

The seal also comprises an inner, second sealing ring 54 with an inner sealing surface 55 abutting the plunger 3 and an end surface 56 abutting the seal holder. The ring is formed with a radially outwardly directed conical surface 57 facing the conical surfaces 58 and 59 of the ring 50. Between the surfaces 57 and 58 there is a gap 60 allowing a very limited axial movement for the ring 54. Between the surface 57 and 59 there is formed a gap 62 intended for a sealing ring 61. The rings 50 and 54 and the seal holder form an annular gap 63, in which there is an elastomeric sealing ring 64.

Figure 5:
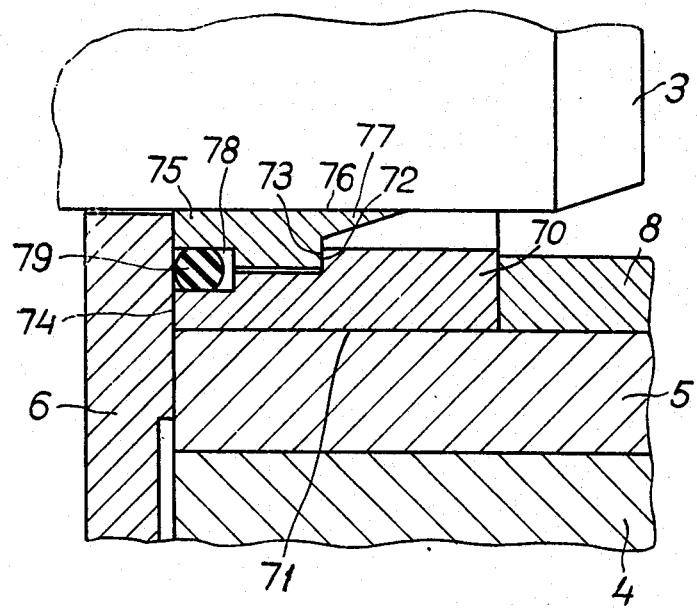

In the embodiment according to FIG. 5, a first sealing ring 70, which is inserted in the liner 5 in a prestressed manner and bears against the liner with its outer surface 71, is formed with a radial shoulder 72. The ring is fixed axially between the seal holder 6 and the spacing sleeve 8, so that its outer end surface 74 makes contact with the seal holder 6. The seal comprises a second sealing ring 75 with a cylindrical sealing surface 76 abutting the plunger. The sealing ring is formed with a shoulder 73 turned towards the pressure chamber and an inner section 77 of triangular cross-section. The outer end surface of the ring makes contact with the seal holder 6. The rings 70 and 75 and the seal holder 6 form a substantially closed annular groove 78. In this there is a sealing ring 79 of elastomeric material.

I claim:

1. A high-pressure seal to effect sealing between the wall of a high pressure cylinder cylinder and a die or an axially movable plunger projecting into the high pressure cylinder, said seal including a seal ring holder and outer and inner sealing rings of metal, the outer ring having an outer cylindrical surface abutting the cylindrical wall and an end surface abutting the seal ring holder, and the inner ring having an inner cylindrical surface abutting the die or the plunger and an end surface abutting said rings holder, the said rings (9, 12) and the rings holder (6) forming an annular groove (15), and an elastic sealing ring (16) in said groove (15) which seals between the sealing rings (9, 12) and the ring holder (6).

2. A press according to claim 1, the inner ring (12) having an outwardly facing conical surface (17), the generatrices of which coincide with the center line of the ring inside the high pressure cylinder (1).

3. A high pressure seal according to claim 2, the outer ring (33, 53) having an inwardly facing conical surface (38, 58) facing the conical surface of the inner ring (33, 53).

4. A high pressure seal according to claim 3, the outer ring having a second conical surface facing and spaced from the conical surface of the inner ring, thereby forming an annular groove (62) and an elastomeric sealing ring (61) in such annular groove.

* * * * *